US006792847B2

(12) United States Patent
Tobin et al.

(10) Patent No.: US 6,792,847 B2
(45) Date of Patent: Sep. 21, 2004

(54) BEVERAGE DISPENSING MACHINE

(75) Inventors: John William Tobin, Hillsdale, NJ (US); Martin John Spisak, Monroe Township, NJ (US)

(73) Assignee: Unilever Bestfoods North America, a division of Conopco, Inc., Englewoods Cliffs, NJ (US)

( * ) Notice: Subject to any disclaimer, the term of this patent is extended or adjusted under 35 U.S.C. 154(b) by 77 days.

(21) Appl. No.: 10/245,950

(22) Filed: Sep. 18, 2002

(65) Prior Publication Data

US 2004/0050259 A1 Mar. 18, 2004

(51) Int. Cl.[7] .................................................. A47J 31/00

(52) U.S. Cl. .......................... 99/275; 99/323.3; 99/290; 222/129.3

(58) Field of Search .......................... 99/275, 290, 279, 99/323.3; 222/129.1, 129.3, 146.1, 146.2

(56) References Cited

U.S. PATENT DOCUMENTS 4,889,148 A 12/1989 Smazik
4,955,507 A 9/1990 Kirschner et al.
5,011,700 A * 4/1991 Gustafson et al. .......... 426/477
6,135,009 A 10/2000 Lassota
6,240,829 B1 6/2001 McGarrah
6,274,187 B1 8/2001 Lehmberg et al.
6,387,424 B2 * 5/2002 Funk .......................... 426/231
6,413,570 B1 7/2002 Lehmberg et al.
2002/0074350 A1 6/2002 Jones et al.

FOREIGN PATENT DOCUMENTS

WO 01/65985 9/2001

* cited by examiner

*Primary Examiner*—Reginald L. Alexander
(74) *Attorney, Agent, or Firm*—Edward A. Squillante, Jr.

(57) ABSTRACT

A brewing machine suitable to deliver beverage enhancing component to a beverage precursor is described. The brewing machine may be used to dispense a ready-to-drink tea beverage having superior aroma, flavor and color characteristics.

14 Claims, 4 Drawing Sheets

BEVERAGE DISPENSING MACHINE

FIELD OF THE INVENTION

The present invention is directed to a beverage dispensing or brewing machine. More particularly, the present invention is directed to a beverage dispensing or brewing machine comprising a delivery means suitable to deliver a beverage enhancing component to a beverage precursor. The delivery means is suitable to deliver beverage enhancing component to the beverage precursor directly, to the diluent directly, to the beverage precursor when it is being combined with diluent or after the beverage precursor has been combined with diluent. The beverage dispensed from the beverage dispensing machine of the present invention has superior flavor and aroma characteristics.

BACKGROUND OF THE INVENTION

Methods for preparing ready-to-dispense beverages, like tea beverages, are known. For example, many food establishments have brewing systems that dispense tea-based beverages ready for consumption. Typically, such systems operate by mixing an instant tea or a brewed tea concentrate with hot water to produce a hot water composition that is combined with cold water to thereby produce a tea beverage that is ready to drink.

Unfortunately, however, when preparing beverages, like tea beverages, from a beverage precursor in the manner described above, the beverages often have, for example, flavor and aroma characteristics that do not meet desired expectations, especially when the beverage precursor employed has aged. This is true because beverage enhancing components, like flavor- and aroma-generating compounds found in beverage precursors, typically, degrade within the beverage precursor, a direct result of their unstable nature in the presence of conventional beverage precursor components.

It is of increasing interest to develop a beverage dispensing machine that comprises a delivery means for delivering a beverage enhancing component (not formulated within a beverage precursor) to a beverage precursor. This invention, therefore, is directed to a beverage dispensing machine comprising a delivery means suitable to deliver a beverage enhancing component to a beverage precursor directly, to a diluent directly, to the beverage precursor when it is being combined with diluent, or to a mixture comprising beverage precursor and diluent. Such an apparatus can store beverage precursor and beverage enhancing component separately from each other. The apparatus can also deliver beverage precursor and beverage enhancing component so that a beverage, of superior flavor and aroma, can be made for consumption.

Additional Information

Efforts have been disclosed for making beverages. In U.S. Pat. No. 6,413,570, a brewed tea concentrate suitable for making a tea beverage is described.

Still other efforts have been disclosed for dispensing beverages. In U.S. Pat. No. 6,135,009, a beverage brewing system on a serving cart assembly is described.

Even other efforts have been disclosed for dispensing beverages. In World Application WO 01/65985, a brewing device having automatic and semi-automatic brewing modes is described.

None of the additional information above describes a beverage dispensing machine comprising a delivery means suitable to deliver a beverage enhancing component to a beverage precursor within the beverage dispensing machine.

SUMMARY OF THE INVENTION

In a first aspect, the present invention is directed to a kit for modifying a conventional beverage dispensing machine, the kit comprises:

(i) a delivery means comprising:
  - a) a pump head operatively connectable to an existing food grade pump within the beverage brewing machine, or a food grade pump with a pump head suitable for addition to the beverage dispensing machine;
  - b) a first conduit for transporting the beverage enhancing component to an inlet of the pump head;
  - c) at least one fitting means for connecting the first conduit to the inlet of the pump head;
  - d) a second conduit for transporting beverage enhancing component from the pump head to beverage precursor within the beverage dispensing machine;
  - e) at least one fitting means for connecting the second conduit to an outlet of the pump head, and at least one fitting means for connecting the second conduit to a conduit for supplying beverage precursor or to a storage compartment storing beverage precursor or to a diluent feed conduit or to a combination thereof;
  - f) optionally, a storage device for storing beverage enhancing component; and (ii) instructions for modifying the beverage dispensing machine with the delivery means.

In a second aspect, the present invention is directed to a beverage dispensing machine comprising the delivery means of the first aspect of this invention.

Beverage precursor, as defined herein, is meant to mean a material that can be contacted with a diluent, like water, to produce a beverage, including a liquid extract or concentrate, powder or ground bean, such as ground coffee bean.

Delivery means is defined to mean a means for delivering a beverage enhancing component, in addition to the mechanism for delivering beverage precursor.

Beverage enhancing component is defined to mean a component that is naturally found in beverage precursor. Such a beverage enhancing component may be isolated from beverage precursor and is preferably a liquid at ambient temperature. Illustrative beverage enhancing components include flavor-generating compounds, aromagenerating compounds, color-generating compounds and the like. Moreover, typical beverage additives like milk and table sugar for coffee and tea, are not beverage enhancing components as defined herein.

Beverage means a liquid composition that a consumer may drink, either hot or cold. Beverage, therefore, is meant to include coffee and tea-based beverages, whereby coffee beverages are derived from a coffee bean and include ground coffee, and tea-based beverages are derived from *Camillia sinensis* and also include herbal teas.

BRIEF DESCRIPTION OF THE FIGURES

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

There is no limitation with respect to the beverage dispensing or brewing machine that may be used with the kit of this invention, as long as the machine has the capacity to dispense or deliver a beverage precursor. Illustrative examples of the types of beverage dispensing machines that may be fitted with the delivery means of this invention include those made commercially available from suppliers like Bunn-O-Matic, IMI Cornelius, Inc., Curtis, Black and Decker, and Cecilware. The most preferred beverage dispensing machines that may be used with the delivery means of the present invention are made available by Unilever Bestfoods and sold under the Lipton Tea Brand.

As to the pumps and pump heads used with the delivery means of this invention, such pumps and pump heads are limited to those that are employable to deliver beverage precursors for beverages that are consumable by humans (i.e., food grade pumps). Such pumps and pump heads are made commercially available from suppliers like Cole-Palmer (e.g., Master Flex Peristaltic Pump); Watson-Marlow Bredel; and Barnant Company.

The conduit and/or lines (e.g., tubing) used in this invention are limited only to the extent that they may be used to deliver beverages suitable for consumption by humans. Such conduit and lines may be made of materials comprising copper, galvanized metal, stainless steel, polycarbonate, polyamide, polyester, polyolefin, or the like. In a most preferred embodiment, the conduit and/or lines used in the present invention are Norprene® comprising, and have an inside diameter from about 0.01 to about 2.0 cm, and preferably, from about 0.02 to about 1.0 cm, and most preferably, from about 0.05 to about 0.4 cm, including all ranges subsumed therein.

The beverage precursor suitable for use in this invention is often a powder or concentrate for making coffee, tea, milk-based or a fruit flavored beverage. In a preferred embodiment, however, the beverage precursor is a concentrate used to make tea-based beverages whereby the concentrate is preferably at least about 45.0% by weight total solids and made available from suppliers like Unilever Bestfoods, under the general category of Lipton Tea Concentrates. A more detailed description of the preferred concentrates that may be used in this invention is described in U.S. Pat. No. 6,274,187, the disclosure of which is incorporated herein by reference.

Figure 1:
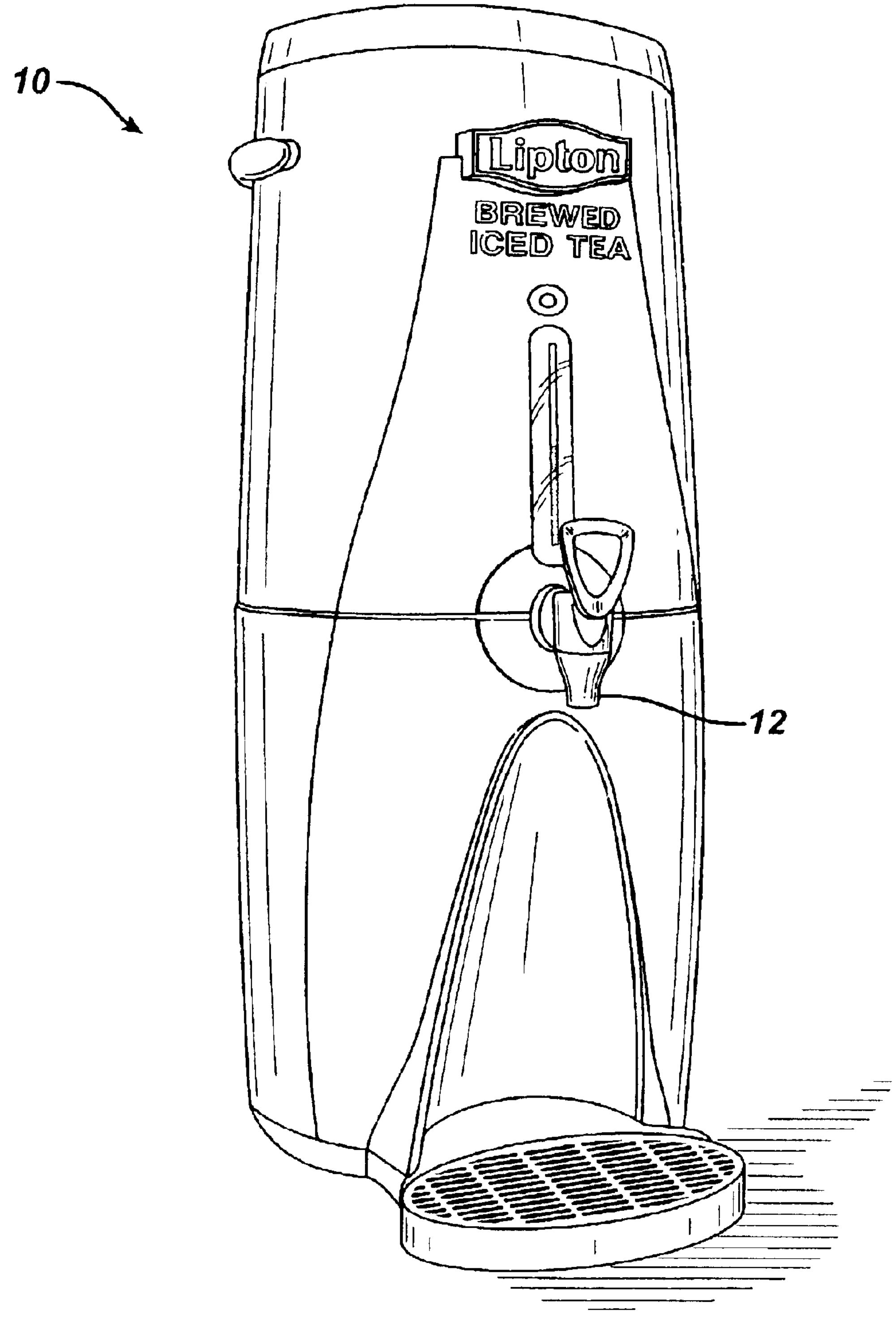
FIG. 1 is a drawing showing an illustrative dispensing or brewing machine that can comprise the beverage enhancing compound delivery means of present invention.

Turning to the figures, FIG. 1 shows a beverage dispensing machine 10 comprising the delivery means of the present invention (not shown). The beverage dispensing machine 10 may be used, for example, to dispense tea-based beverage (not shown) from exit pore 12.

Figure 2:
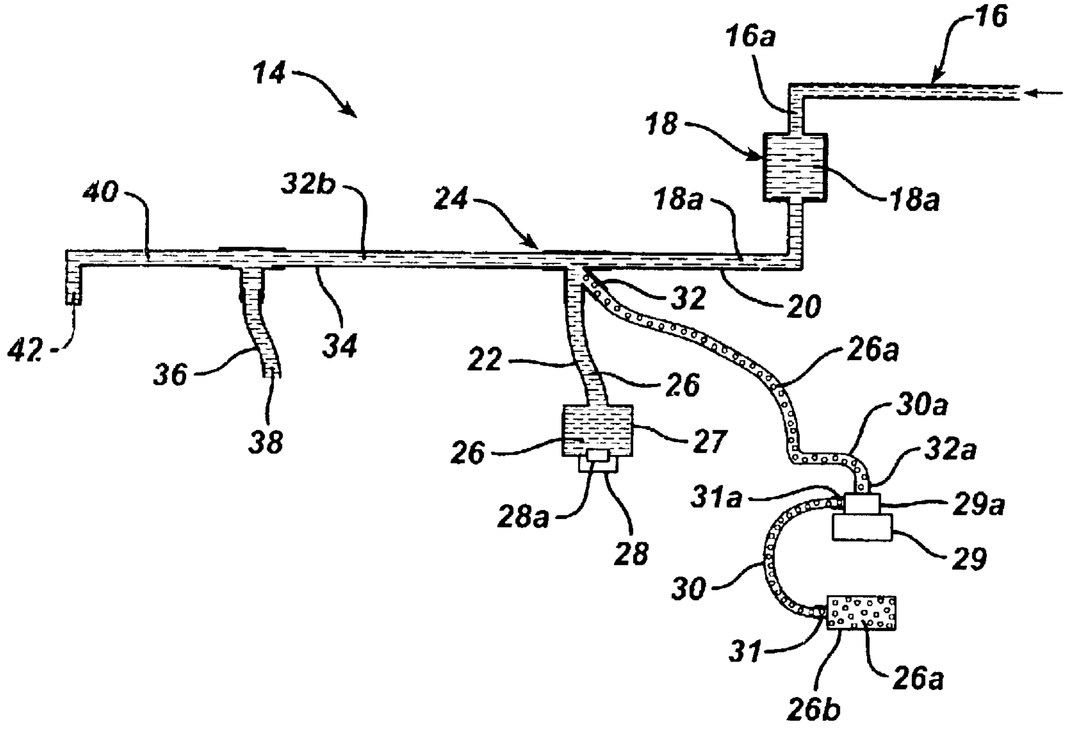
FIG. 2 is an illustrative diagram of the present invention with beverage enhancing component being delivered directly to beverage precursor.

FIG. 2 depicts an illustrative schematic diagram of a brewing system 14 which is within the beverage dispensing machine 10 and equipped with an illustrative version of the delivery means of the present invention such that flavor enhancing component is delivered to the beverage precursor directly. Diluent feed conduit 16 supplies diluent (e.g., water, juice, milk or the like) 16*a* to diluent heater tank 18 to produce heated diluent 18*a*. Conduit for supplying heated diluent 20 joins, for example, with conduit for supplying beverage precursor 22 at mixing conduit 24. Beverage precursor 26, in storage compartment 27, is pumped, via food grade pump 28 with pump head 28*a*, through conduit for supplying beverage precursor 22.

Beverage enhancing component 26*a* in storage device 26*b* (e.g., bottle or polymeric sachet) is transported (pumped) via second food grade pump 29 with pump head (and inlet not shown) 29*a* via first conduit for transporting beverage enhancing component 30, the same being connected to storage device 26*b* and pump head 29*a* via fitting means (e.g., tee or coupling or connecting device) 31 and 31*a*, respectively. From pump head 29*a*, beverage enhancing component 26*a* is delivered (pumped) to beverage precursor 26 by way of second conduit for transporting beverage enhancing component 30*a* which is connected, via fitting means 32 and 32*a* (e.g., tee or coupling or connecting device), to conduit for supplying beverage precursor 22 and pump head 29*a*, respectively. Within fitting means 32, beverage precursor 26 and beverage enhancing component 26*a* meet directly and before being subjected to heated diluent 18*a* in mixing conduit 24. At mixing conduit 24, heated diluent 18*a*, beverage precursor 26 and beverage enhancing component 26*a* mix to produce a heated mixture 32*b*. The heated mixture 32*b* is transported via heated mixture conduit 34 where conduit for supplying diluent that has not been heated 36, optionally, supplies non-heated diluent (e.g., water) 38 (supplied from a storage container or tap, both not shown) into heated mixture 32*b*. Produced is a superior beverage 40, having, for example, excellent flavor, color and aroma characteristics, whereby the beverage 40 is ready to be discharged at opening 42 by way of exit port 12.

Figure 3:
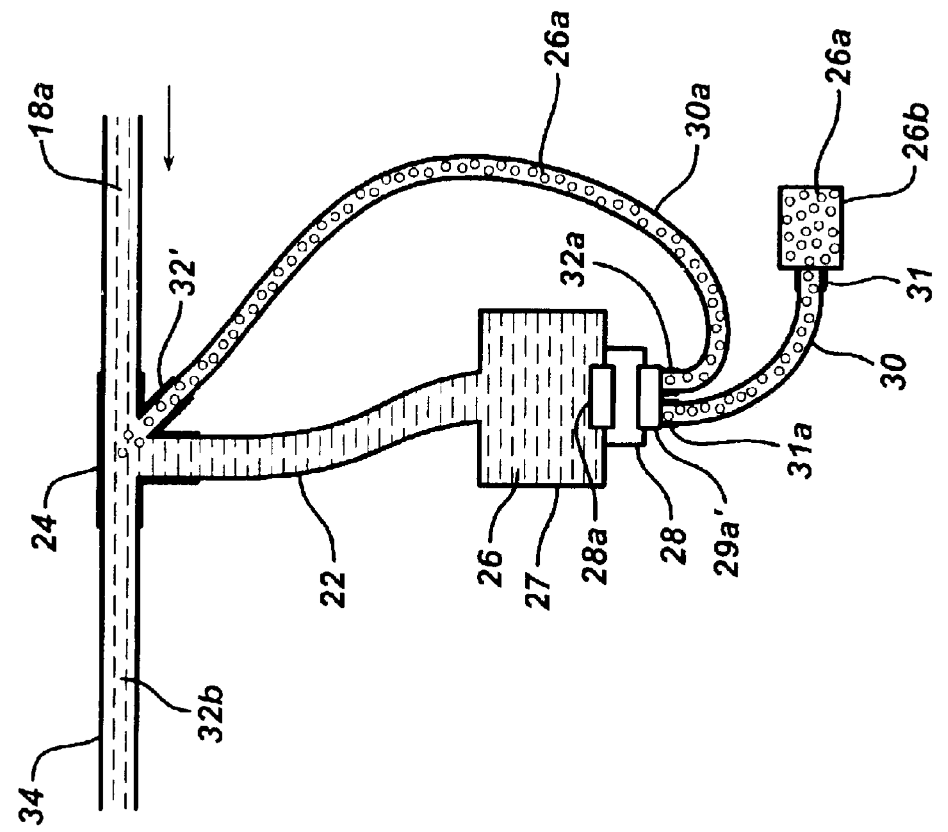
FIG. 3 is an illustrative diagram of the present invention with beverage enhancing component being delivered to beverage precursor when the same is being combined with diluent.

Turning to FIG. 3, beverage enhancing component 26*a* in storage device 26*b* is transported via first conduit for transporting beverage enhancing component 30 to pump head 29*a*' which is mounted or operatively connected to food grade pump 28 in lieu of second food grade pump 29 as illustrated in FIG. 2. First conduit for transporting beverage enhancing component 30 is connected to storage device 26*b* and pump head 29*a*' via fitting means 31 and 31*a*, respectively. Beverage enhancing component 26*a* is delivered to beverage precursor 26 by way of second conduit for transporting beverage enhancing component 30*a* which is connected to conduit for supplying beverage precursor 22 and conduit for supplying heated diluent 20, via fitting means 32', and pump head 29*a*', via fitting means 32*a*. The connection at fitting means 32' allows for the delivery of beverage enhancing component 26*a* to beverage precursor 26 at a point where beverage precursor 26 is being combined with diluent 18*a*.

Figure 4:
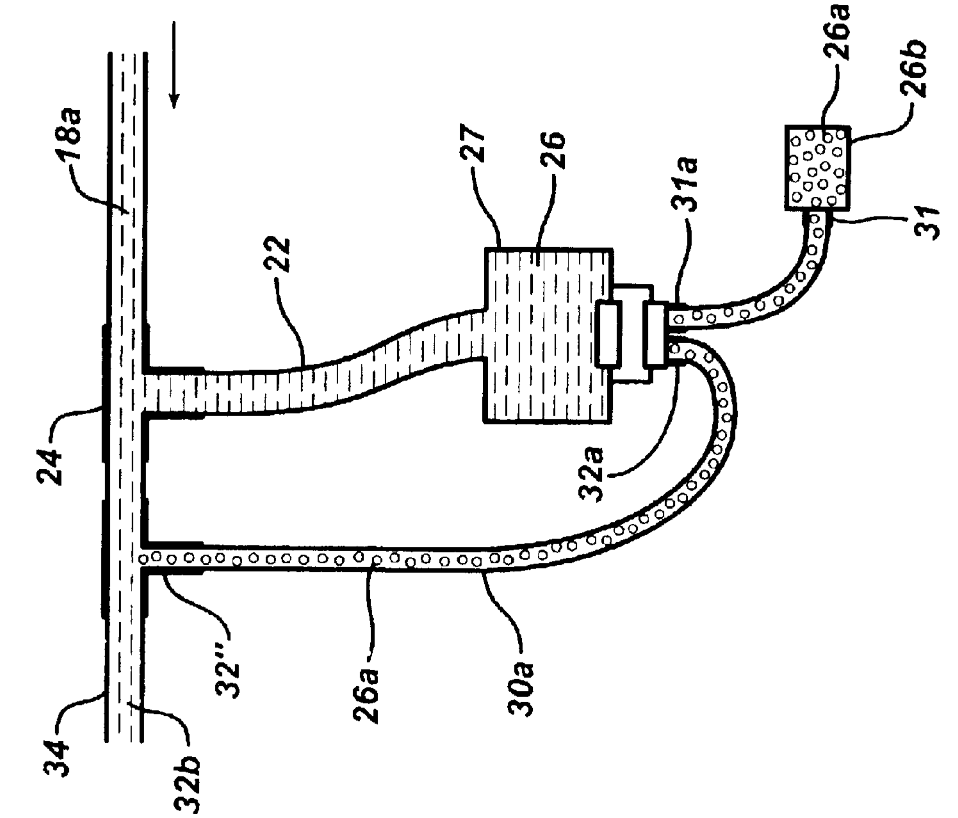
FIG. 4 is an illustrative diagram of the present invention with beverage enhancing component being delivered to a mixture of beverage precursor and diluent.

FIG. 4 depicts an illustrative schematic diagram of a portion of brewing system 14 similar to the illustrative schematic diagram shown in FIG. 3 except that beverage enhancing component 26*a* is delivered to beverage precursor 26 after beverage precursor 26 has been combined with diluent 18*a*. This is achieved by moving second conduit for transporting beverage enhancing component 30*a*, downstream within the dispensing machine 10, such that fitting means 32" connects second conduit 30*a* to heated mixture conduit 34.

Figure 5:
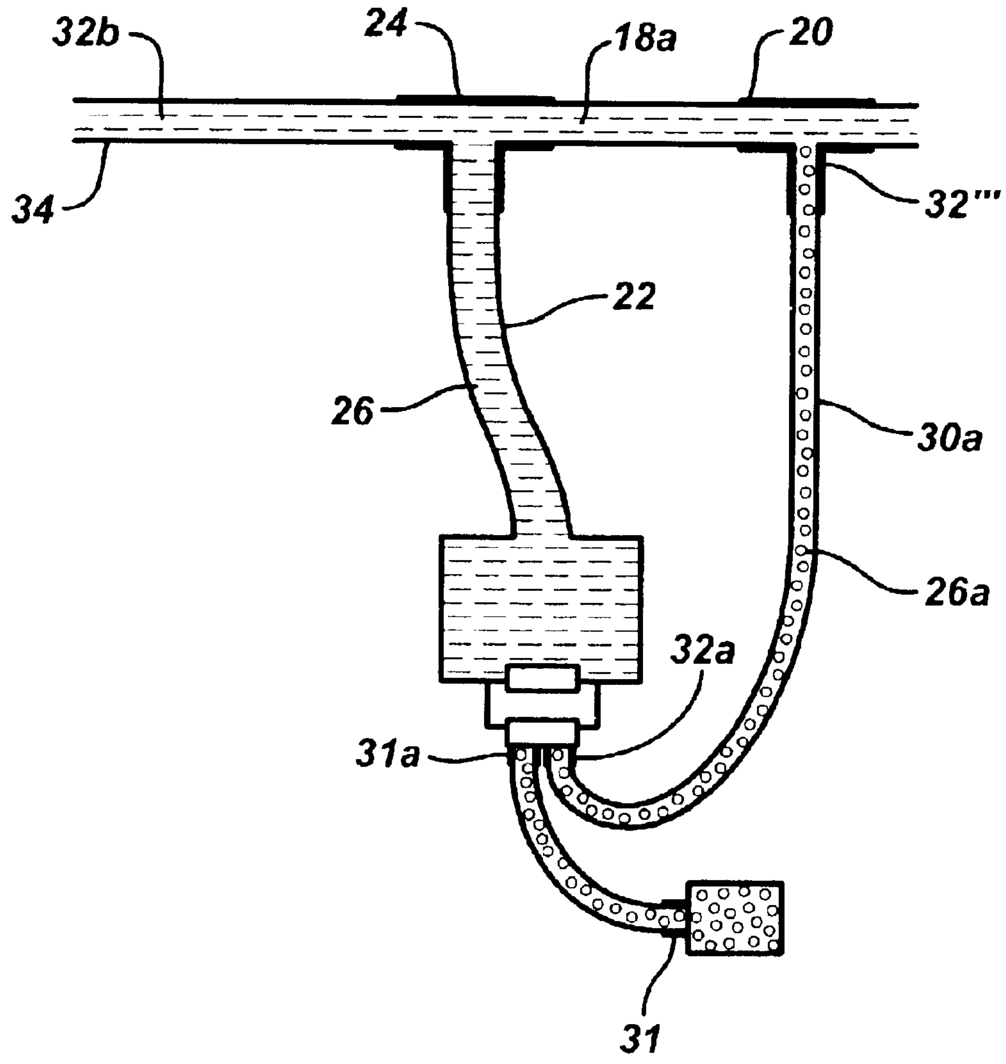
FIG. 5 is an illustrative diagram of the present invention with beverage enhancing component being delivered directly to diluent.

FIG. 5 depicts an illustrative schematic diagram of a portion of a brewing system 14 similar to the illustrative schematic diagram shown in FIG. 4 except that beverage enhancing component is 26*a* is delivered to diluent 18*a* directly. This is achieved moving second conduit for transporting beverage enhancing component 30*a*, upstream within the dispensing machine 10, such that fitting means 32''' connects second conduit 30*a* to conduit for supplying heated diluent 20.

When making a beverage, like a tea-based beverage, with the system of the present invention, the beverage typically comprises at least about 80.0%, and preferably, at least about 85.0%, and most preferably, at least about 90.0% by weight total diluent (i.e., total diluent being the total amount of heated and non-heated diluent), the balance of the total weight of the beverage comprising no less than about 0.1% by weight beverage precursor, and preferably, no less than about 1.0% by weight beverage precursor. The total amount of diluent used can comprise 100.0% heated diluent, but preferably comprises less than about 45.0%, and most preferably, less than about 30.0% by weight heated diluent, but at least about 1.0% by weight heated diluent. Moreover, the beverage brewed via the beverage dispenser of the present invention typically exits the beverage brewing machine from the exit port at a flow rate from about 1.0 to about 5.0, and preferably, from about 1.5 to about 4.0, and most preferably, from about 2.0 to about 3.0 fluid ounces/second, including all ranges subsumed therein.

The instructions that are supplied with the kit of this invention explain, in detail, how to modify an existing beverage dispensing machine with the components (e.g., pump head and conduit) supplied in the kit. In an especially preferred embodiment, the second conduit for transporting beverage enhancing component from the pump head and to the beverage precursor (directly or indirectly) has an inside diameter that is at least about 50.0%, and preferably, at least about 65.0%, and most preferably, at least about 75.0% smaller than the inside diameter of the conduit for supplying beverage precursor.

The following example is provided to facilitate an understanding of the present invention. The example is not intended to limit the scope of the invention as set forth in the claims.

EXAMPLE

A tea brewing machine having the capacity to dispense beverage precursor was fitted with an additional pump head. The additional pump head was mounted in parallel with the pump head used to deliver beverage precursor. Peristaltic tubing was used with a tee and connector to connect the additional pump head to a line or conduit carrying beverage precursor (tea concentrate with about 50% tea solids) and to a storage compartment having beverage enhancing component (flavor and aroma compounds isolated from a tea concentrate). Tea, ready for drinking, was dispensed from the tea brewing machine and given to about 25 panelists. All of the panelists concluded that the tea dispensed from the machine of this invention had superior flavor and aroma characteristics when compared to tea dispensed from a conventional machine that was not equipped with the beverage enhancing component delivery system of the present invention.

What is claimed is:

1. A kit for modifying a beverage dispensing machine, the kit comprising:

(i) a delivery means comprising:

a) a pump head operatively connectable to an existing food grade pump within the beverage dispensing machine, or a food grade pump with a pump head suitable for addition to the beverage dispensing machine;

b) a first conduit for transporting the beverage enhancing component to an inlet of the pump head;

c) at least one fitting means for connecting the first conduit to the inlet of the pump head;

d) a second conduit for transporting beverage enhancing component from the pump head to beverage precursor within the beverage dispensing machine;

e) at least one fitting means for connecting the second conduit to an outlet of the pump head, and at least one fitting means for connecting the second conduit to a conduit for supplying beverage precursor or to a storage compartment storing beverage precursor or to a diluent feed conduit or to a combination thereof; and f) a storage device for storing beverage enhancing component; and (ii) instructions for modifying the beverage dispensing machine with the delivery means.

2. The kit according to claim 1 wherein the kit comprises a pump head operatively connectable to an existing food grade pump within the beverage dispensing machine.

3. The kit according to claim 1 wherein the kit comprises a food grade pump and a pump head for addition to the beverage dispensing machine.

4. The kit according to claim 1 wherein the storage device comprises a beverage enhancing component.

5. The kit according to claim 4 wherein the beverage enhancing component is a flavor enhancing component, an aroma enhancing component, a color enhancing component or a mixture thereof.

6. The kit according to claim 1 wherein the first conduit and the second conduit have an inside diameter from about 0.01 to about 2.0 cm.

7. The kit according to claim 1 wherein the second conduit has a diameter that is at least about 50.0% smaller than an inside diameter of the conduit for supplying beverage precursor within the beverage dispensing machine.

8. A beverage dispensing machine comprising:

(a) a pump head operatively connectable to an existing food grade pump having an original pump head and within the beverage dispensing machine, or a separate food grade pump with a pump head suitable for addition to the beverage dispensing machine which already comprises a food grade pump having an original pump head;

(b) a first conduit for transporting a beverage enhancing component from a storage device to an inlet of the pump head;

(c) at least one fitting means for connecting the first conduit to the inlet of the pump head;

(d) a second conduit for transporting beverage enhancing component from the pump head indirectly or directly to beverage precursor within the beverage dispensing machine; and (e) at least one fitting means for connecting the second conduit to an outlet of the pump head, and at least one fitting for connecting the second conduit to a conduit for supplying the beverage precursor or to a storage compartment storing the beverage precursor or to a diluent feed conduit or to a mixture conduit or to a combination thereof.

9. The beverage dispensing machine according to claim 8 wherein the pump head is operatively connected to the food grade pump having an original pump head within the machine, the pump head suitable to deliver beverage enhancing component to the beverage precursor within the machine and connected to the food grade pump in parallel to the original pump head.

10. The beverage dispensing machine according to claim 8 wherein the machine comprises a separate food grade pump and pump head suitable to deliver beverage enhancing component to the beverage precursor within the machine.

11. The beverage dispensing machine according to claim 8 wherein the beverage dispensing machine dispenses a tea-based beverage, a milk-based beverage, a coffee-based beverage or a fruit-based beverage.

12. The beverage dispensing machine according to claim 8 wherein the beverage dispensing machine dispenses a tea-based beverage.

13. The beverage dispensing machine according to claim 8 wherein the original pump head of the food grade pump delivers beverage precursor via the conduit for supplying beverage precursor to diluent within the machine.

14. The beverage dispensing machine according to claim 8 wherein the second conduit for transporting beverage enhancing component has an inside diameter that is at least about 50% smaller than an inside diameter of the conduit for supplying beverage precursor.

* * * * *